No. 814,517.  
PATENTED MAR. 6, 1906.  
W. G. CAIN.  
MEANS FOR LOCATING AND RAISING SUNKEN VESSELS.  
APPLICATION FILED JULY 31, 1905.
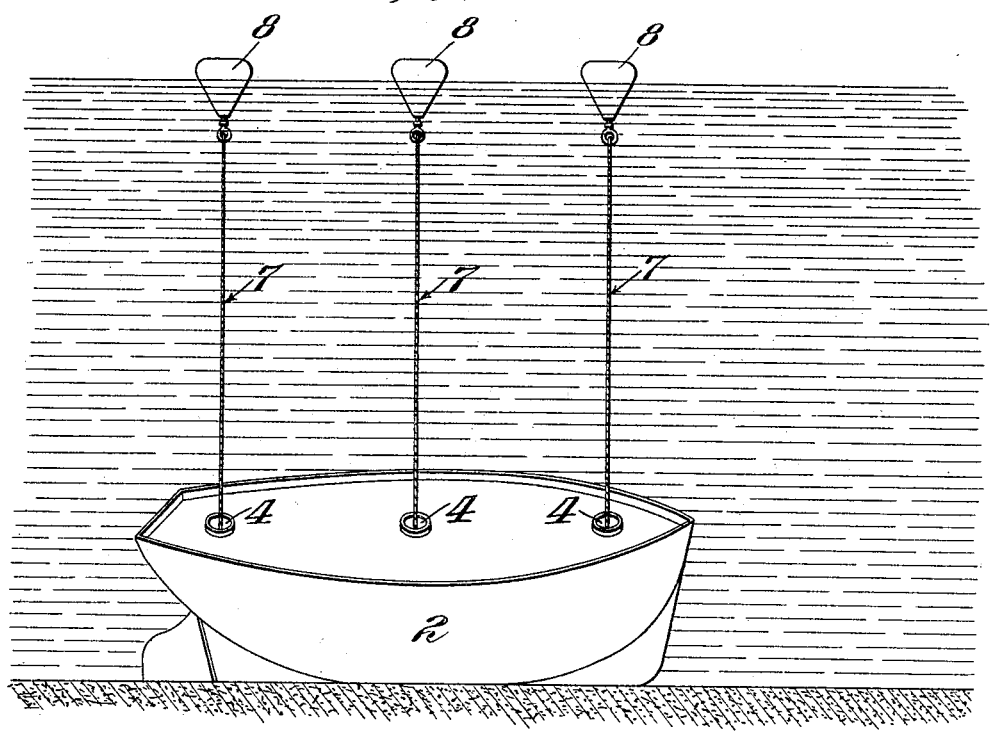
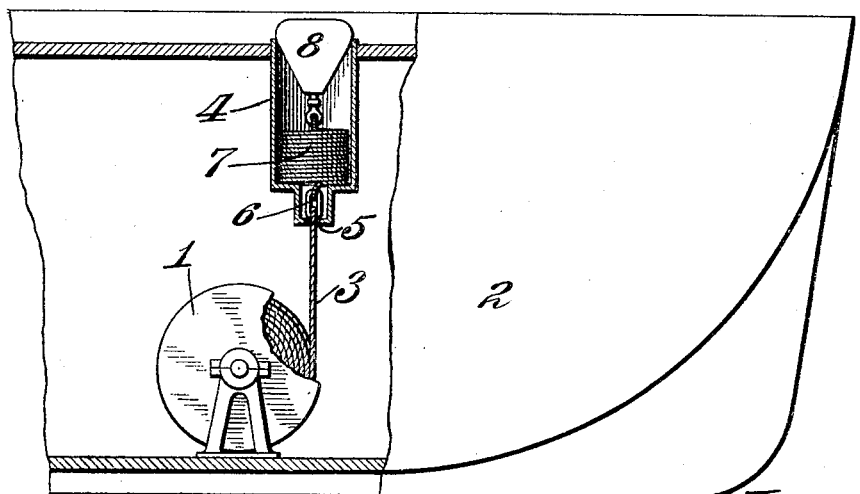

UNITED STATES PATENT OFFICE.

WILLIAM G. CAIN, OF VICTORIA, LOUISIANA.

MEANS FOR LOCATING AND RAISING SUNKEN VESSELS.

No. 814,517.     Specification of Letters Patent.     Patented March 6, 1906.

Application filed July 31, 1905. Serial No. 271,971.

*To all whom it may concern:*

Be it known that I, WILLIAM G. CAIN, a citizen of the United States, residing at Victoria, Natchitoches parish, Louisiana, have invented a certain new and useful Improvement in Means for Locating and Raising Sunken Vessels, of which the following is a full, clear, and exact description, such as will enable others skilled in the art to which it appertains to make and use the same, reference being had to the accompanying drawings, forming part of this specification, in which—

Figure 1 is a perspective view of a vessel equipped with a device constructed in accordance with my invention; and Fig. 2 is a view of a vessel, partly in elevation and partly in section, showing my invention applied.

This invention relates to means for locating and raising sunken vessels; and one of the objects is to provide means whereby the marking of the location of a sunken vessel so that the vessel may be easily identified and raised by suitable apparatus to be herein described.

The vessel will be equipped with one or more (in the present instance three) winding-drums 1, suitably supported in the vessel 2. On each winding-drum will be a cable 3 of sufficient size to withstand the strain in raising the vessel when power is applied from the wrecking vessel or barge on the surface of the water. Secured to the deck of the vessel and projecting into the interior of the vessel is a receptacle 4, having at its lower end a contracted portion of less diameter than the main portion of the receptacle. This contracted portion of the receptacle is adapted to form a housing for a link 6 and hold it in a substantially vertical position, the lower end of said link having connected thereto one end of the cable 3, which extends through an opening in the bottom of the contracted portion of the receptacle, and the upper end of the link having connected thereto a cable 7, of comparatively light material, which may be conveniently coiled upon the bottom of the main portion of the receptacle 4, as shown in Fig. 2. Seated upon the upper edge and extending within the receptacle 4 is a float 8, which is preferably connected to the lighter line or cable 7 by a swivel, said float 8 lightly resting upon the top of the receptacle, so that should the vessel be submerged said float will immediately rise to the surface and automatically pay out the line or cable 7. The salvage or wrecking vessel may thus easily locate the submerged vessel, and by taking in the float 8 the heavier cable 3 may be payed from the reel 1, and after the cable 3 has been unwound from the reel 1 said reel will form an anchor, so that by using suitable means on the salvage or wrecking vessel the submerged vessel may be raised.

Having thus described my invention, what I claim as new, and desire to secure by Letters Patent, is—

A vessel having a reel mounted therein and provided with a deck, a receptacle mounted in said deck having its upper end open to provide a seat for a float, and having its lower end contracted to form a housing of less diameter than the main portion of the receptacle, a relatively light line connected to said float and normally lying in the main portion of said receptacle, the other end of said line having a link fastened thereto which stands in a substantially vertical position in the housing at the lower end of the receptacle, and a cable wound upon said reel and extending through an opening in the bottom of the contracted portion of said receptacle and being connected to the lower end of said link; substantially as described.

In testimony whereof I hereunto affix my signature, in the presence of two witnesses, this 24th day of July, 1905.

WILLIAM G. CAIN.

Witnesses:
   W. E. ADDISON,
   J. A. BRUCE.